United States Patent [19]
Ryan

[11] Patent Number: 5,188,452
[45] Date of Patent: Feb. 23, 1993

[54] COLOR MIXING LIGHTING ASSEMBLY

[75] Inventor: John T. Ryan, Riverdale, N.Y.

[73] Assignee: Altman Stage Lighting Co., Inc., Yonkers, N.Y.

[21] Appl. No.: 766,787

[22] Filed: Sep. 27, 1991

[51] Int. Cl.⁵ .............................. F21V 9/00
[52] U.S. Cl. .................... 362/293; 362/302; 362/319; 362/343
[58] Field of Search ............. 362/18, 293, 298, 319, 362/343, 32, 302

[56] References Cited

U.S. PATENT DOCUMENTS

| 4,602,321 | 7/1986 | Bornhorst | 362/293 X |
| 4,894,760 | 1/1990 | Callahan | 362/293 |
| 5,031,078 | 7/1991 | Bornhorst | 362/293 X |

Primary Examiner—Stephen F. Husar
Attorney, Agent, or Firm—Lackenbach Siegel Marzullo & Aronson

[57] ABSTRACT

Light assembly for providing a focused image of varying color hue and saturation intensity which includes means for providing a point light source, a filter set in which the filters are complementary colors, and a light mixing channel to pass additively mixed light rays to an objective lens system which produces the focused image.

8 Claims, 24 Drawing Sheets

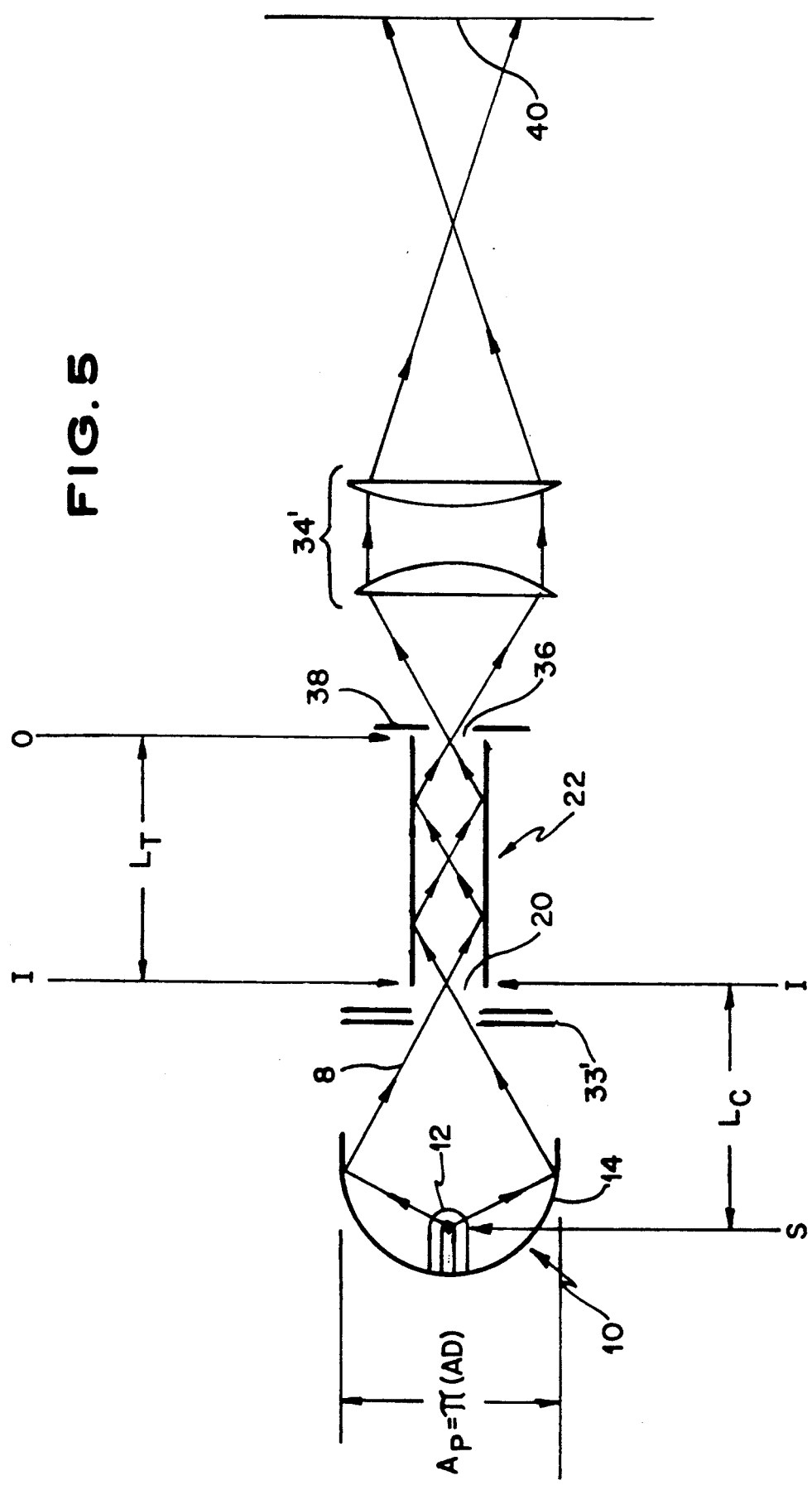

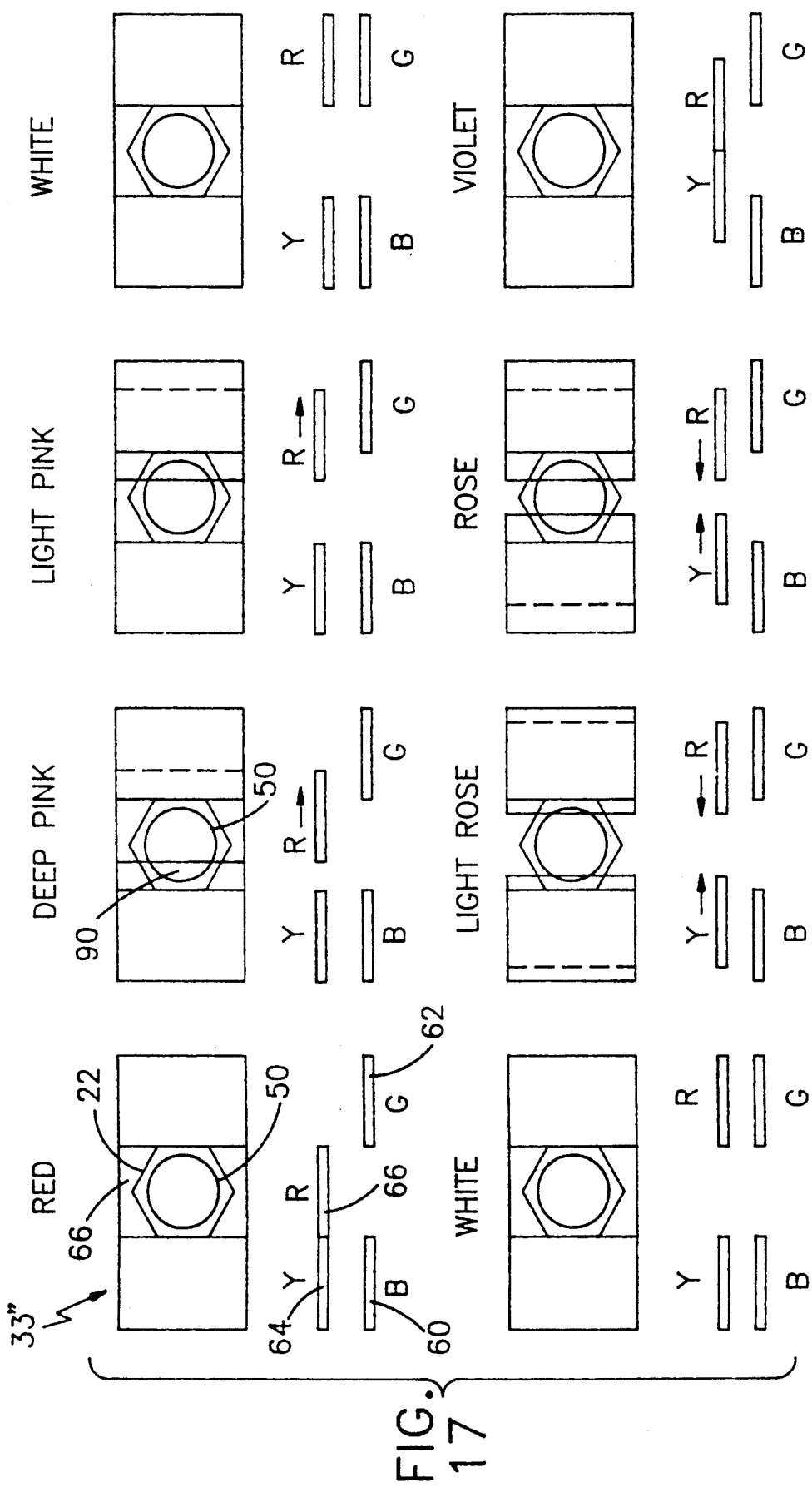

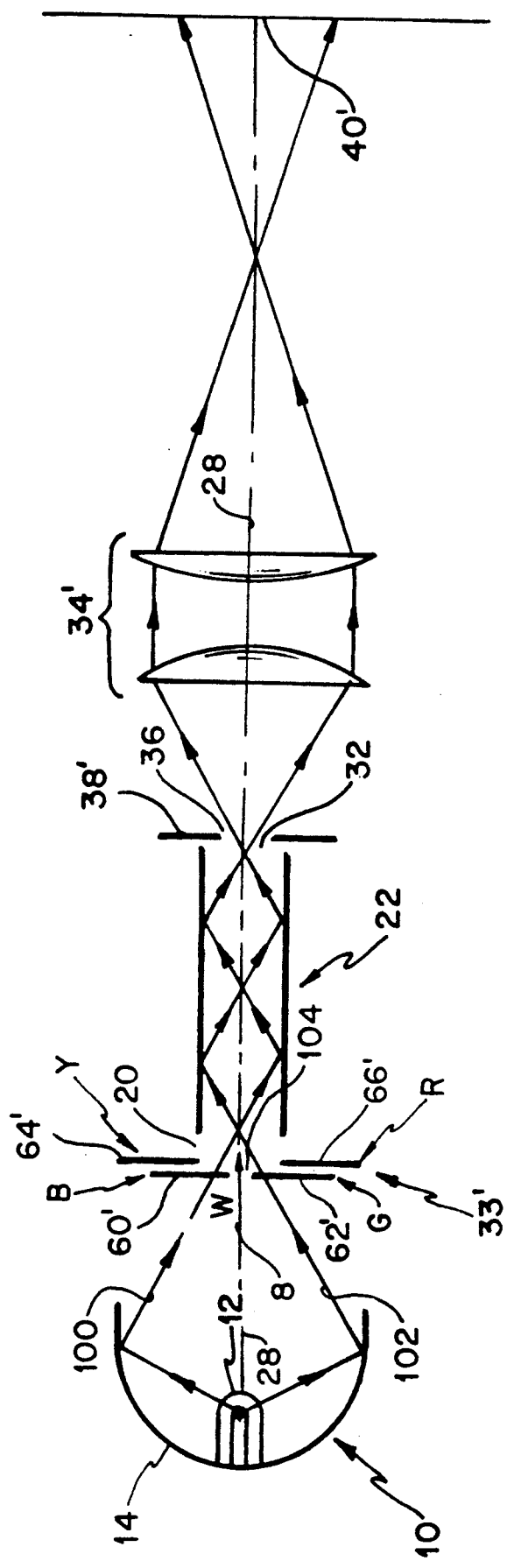

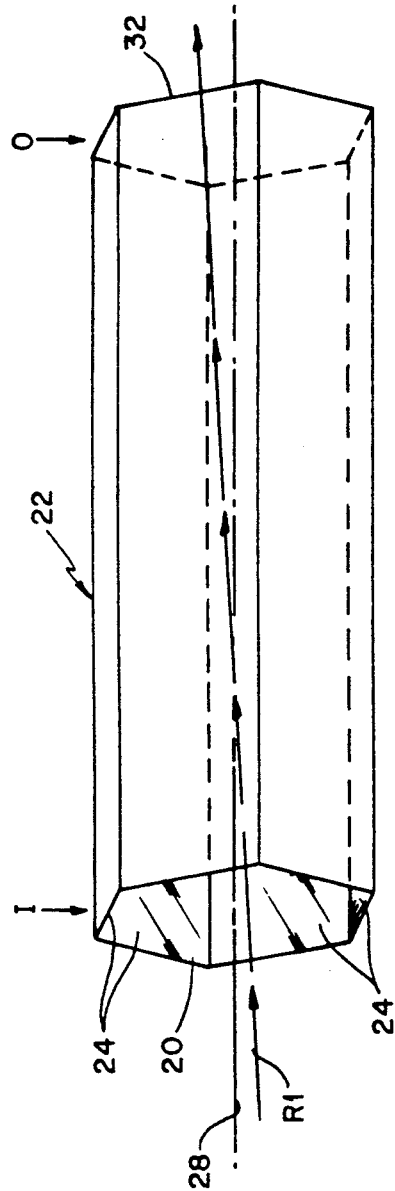
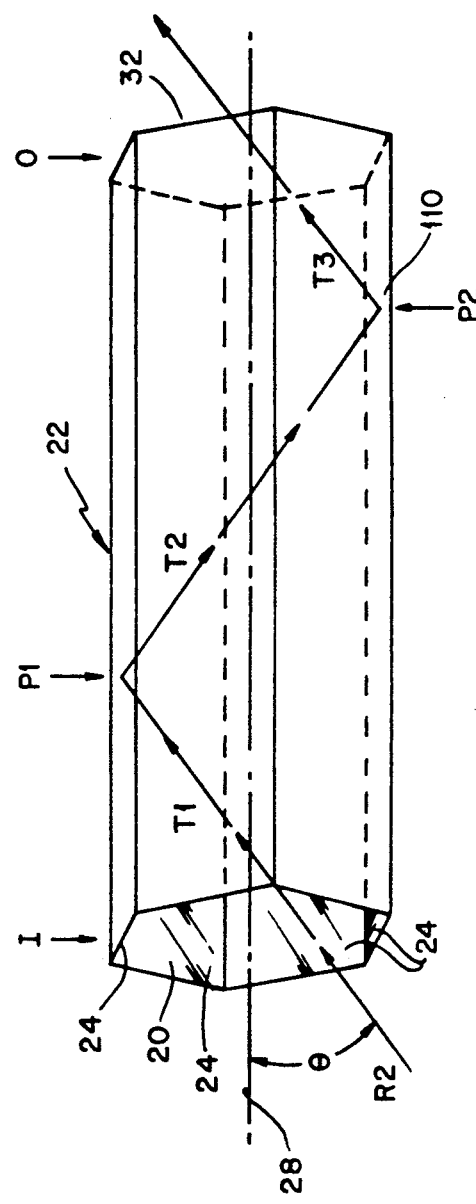

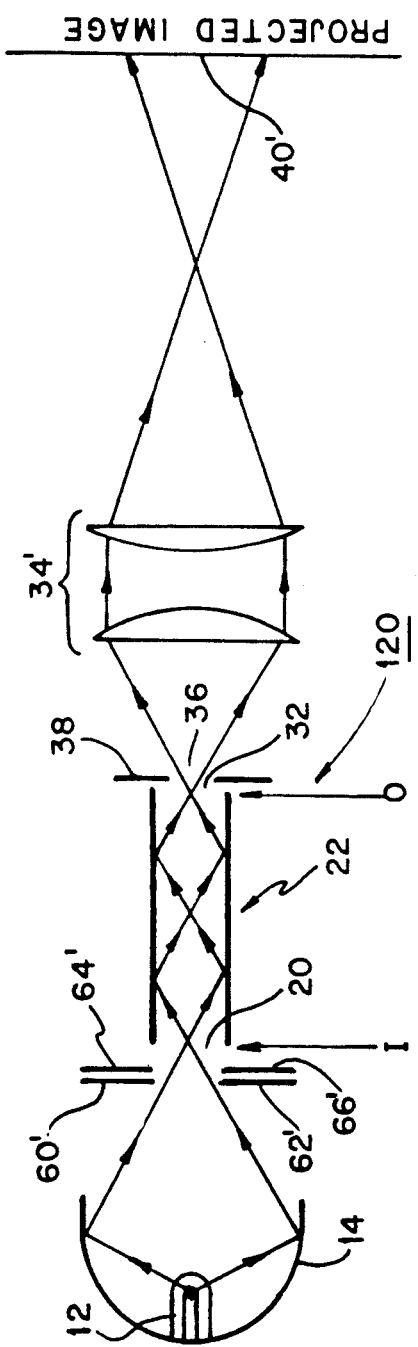
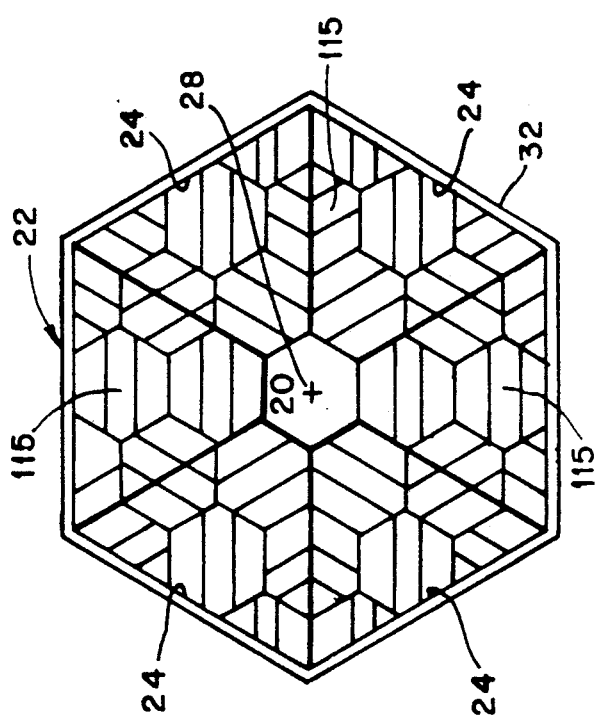

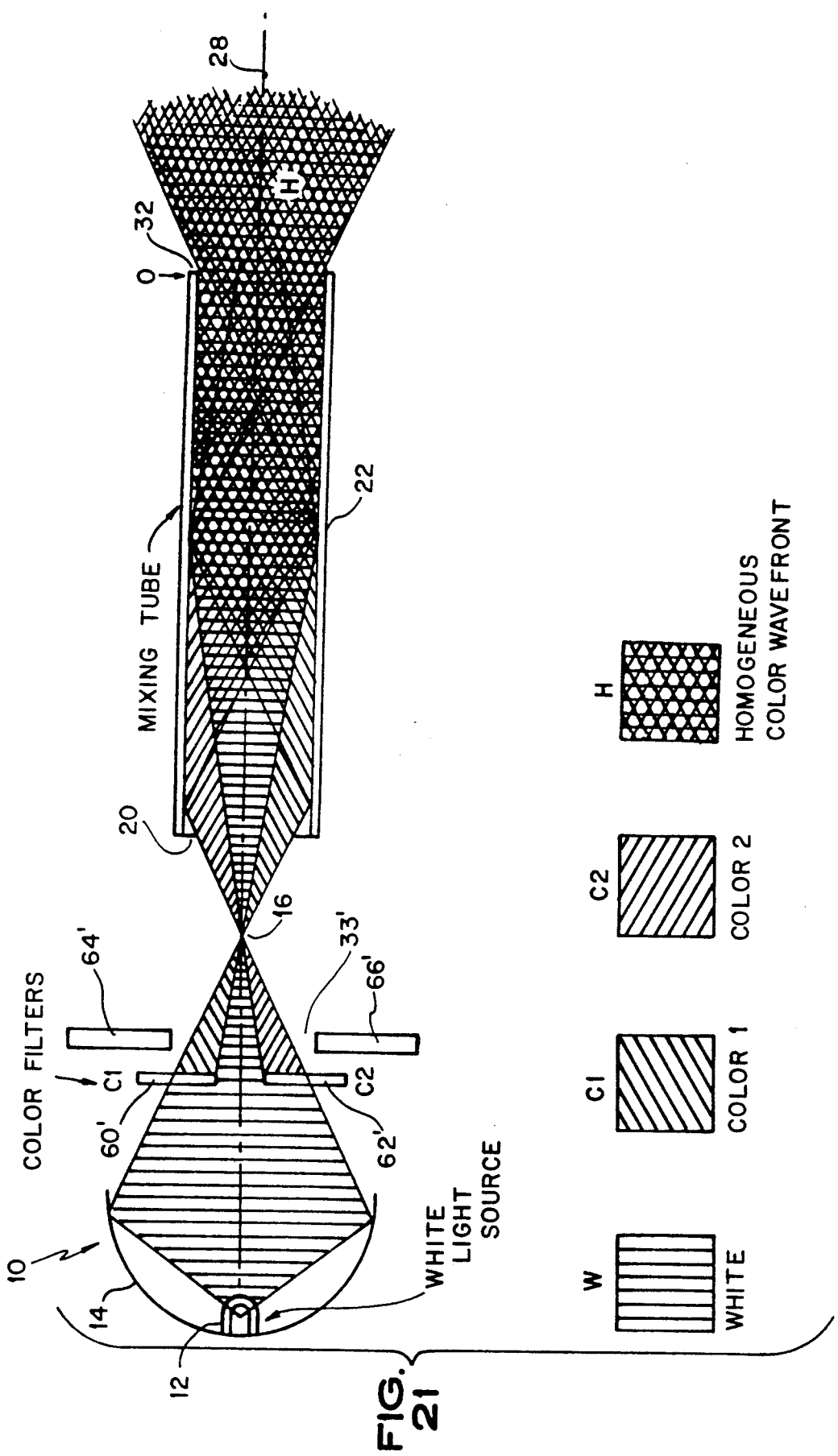

ADDITIVE MIXING　　　　SUBTRACTIVE MIXING

COLOR MIXING LIGHTING ASSEMBLY

FIELD OF THE INVENTION

The present invention relates to a light assembly for use in stage, theater or other environment in which images of varied hue and intensity are employed.

BACKGROUND OF THE INVENTION

Light assemblies are widely used for stage lighting, and also outdoors, and are commonly mounted or hung from supports near the location to be lighted. In the prior art, the color (hue) and intensity of the light source of the assembly are varied by interposing colored filters and mixing white light with colored light. U.S. Pat. No. 4,602321—Bornhorst discloses a light assembly for use with a beam of white light to change the saturation and hue of the beam using pivotable dichroic filters with the technique of tilting the dichroic filters to change the angle of incidence of the light beam to alter, within a limited range, the color hue that is transmitted. Another prior art technique is to pass light rays first through one filter, and then through another, to obtain color variation by "subtractive mixing" using a limited number of color combinations; this technique exhibits abrupt visual "bumps" during color transition. Both of the foregoing techniques involve the utilization of two or more secondary color filters to produce a primary color which may result at times in "dinginess" i.e. degraded color and purity.

SUMMARY OF INVENTION

In accordance with the present invention a light assembly is provided which utilizes "additive mixing" and primary color filters to produce "vibrant" (good quality and purity) colors. Primary colors are provided using an individual primary color filter and secondary colors are produced using side-by-side primary color filters to intercept light rays from a white light source with the respective filters intercepting different light rays. The light assembly of the present invention comprises means for providing a point light source and a longitudinally extending light mixing channel which receives light rays from the point light source and transmits additively mixed light rays from the light source to an objective lens system which provides a focused image. A filter set interposed between the point light source and the light mixing channel enables virtually infinite variation of color (hue) of the focused image and complete variation of saturation. The variations are accomplished smoothly with no visual "bumps."

BRIEF DESCRIPTION OF THE DRAWINGS

FIG. 1 1(A), 1(B) show a perspective view of a light assembly in accordance with the present invention with FIGS. 1(A) and 1(B) showing end views of variations of a component of the assembly FIG. 1;

FIG. 5 shows applicable dimensional relationships for a light assembly of the type shown in FIG. 1;

FIG. 17 shows positions of a slidable color filter array for different color saturations;

FIGS. 18 and 18A show a relationship between a color filter wheel, light beam, and light mixing channel in accordance with the present invention;

FIGS. 19 (A), (B) show light ray paths through the light mixing channel of the light assembly of the invention;

FIG. 20 is an exit end view in perspective of the light mixing channel of FIG. 1 illustrating light mixing effect;

FIG. 21 is a side elevation view in section illustrating exemplary light mixing in the light mixing channel;

FIG. 22 illustrates the projection of an image with the light assembly of the invention;

FIG. 26 is a block diagram illustrating automatic control of the light assembly of the present invention.

DETAILED DESCRIPTION

Figure 1:
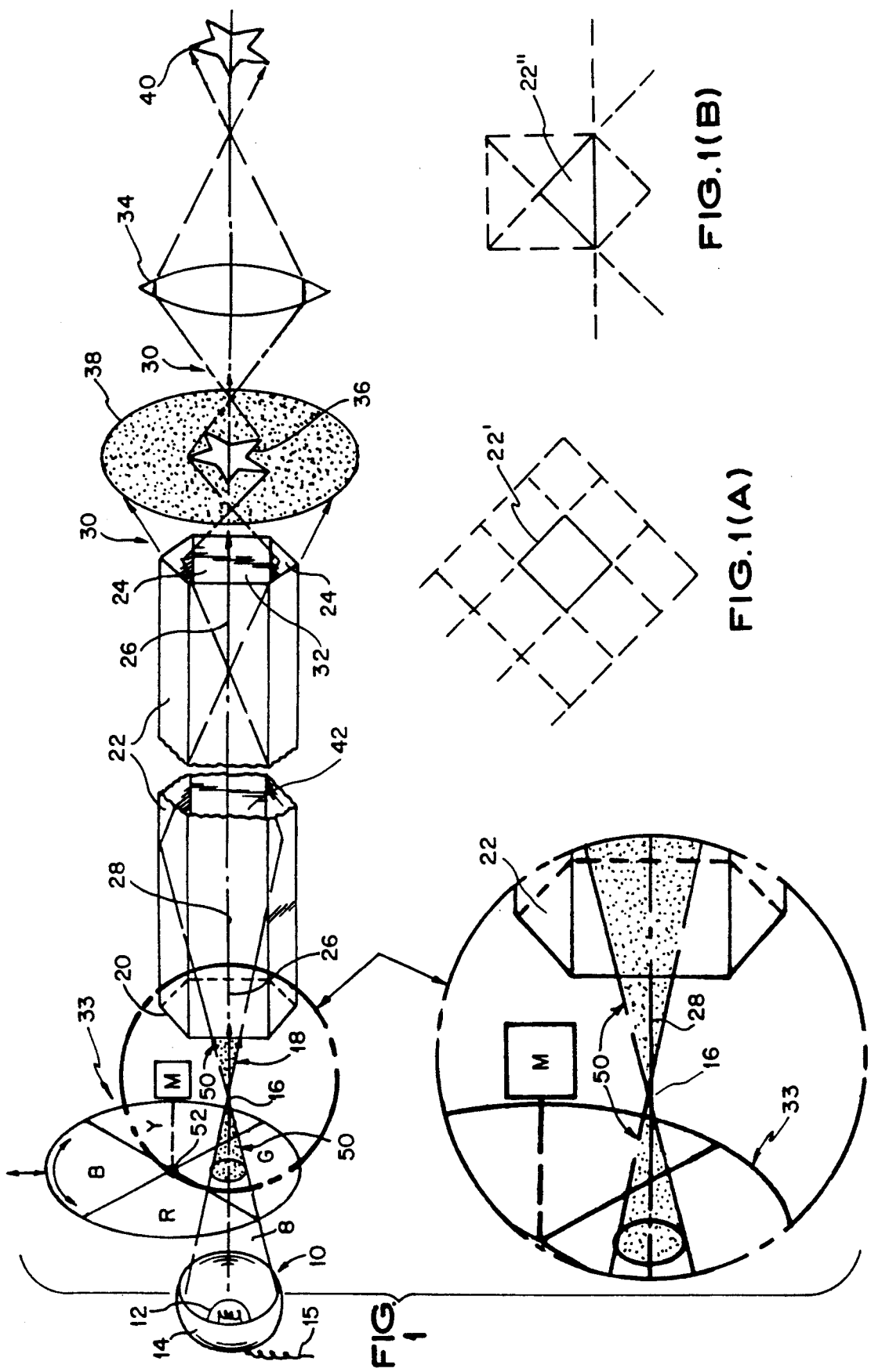

Referring now to the drawings, in FIG. 1 means for producing a point source of light is shown at 10 which includes an electric lamp 12 which receives electrical energy at 15 and generates white light 8. Lamp 12 is positioned in a conventional reflector 14 which is configured to focus the rays of white light 8 at a point 16. The reflector 14 is suitably hemispherical or elliptical in shape to accomplish the focusing of a light source as is well known in the art. Light rays of white and/or colored light emanating from the point 16, shown exemplarily at 18, are received at open end 20 of elongate, longitudinally extending light mixing channel 22 which is hereinafter more fully described. The light rays 18 received by the light mixing channel 22 are reflected form the highly reflective, e.g. silvered, inside surface 24 of light mixing channel 22 and are additively mixed with each other and with unreflected light rays indicated 26 which pass along the longitudinal axis 28 of open ended light mixing channel 22. The additively mixed light rays 30 are transmitted at remote open end 32 of light mixing channel 22 as a specific homogeneous color which is determined by the position of motor driven filter set wheel 33 which consists of contiguous primary color filters, red (R), blue (B), green (G), yellow (Y), as hereinafter more fully described. An objective lens system, e.g. a convex lens 34 is positioned to receive additively mixed light rays 30 of a homogeneous specific color for a focused object indicated at 36 e.g. a "star" cut out of an opaque disk 38.

The objective lens system 34 provides a focused image of the object at 40. The focused image is a specific homogeneous color determined by the position of filter set wheel 33, which can be changed by rotation and movement in or out of the light beam (as shown) of the motor driven filter set wheel 33 to achieve virtually an infinite variety of hues and saturations hereinafter more fully described. As shown in FIG. 1, point light source 16 and the optical axis of lens systems 34 are located on the longitudinal axis 28 of light mixing channel 22. The form of light mixing channel 22 illustrated in FIG. 1 is an open-ended peripherally enclosed elongated tube with a highly light reflective interior surface 42. The cross-section of light mixing channel 22 is a regular equal sided hexagon, which is preferred. Other suitable cross-sectional geometrical configurations are those which are capable of being arranged in a two dimensional infinitely repeatable array of contiguous shapes which have total peripheral contact, e.g. no spaces in between. Geometrical shapes with three or four sides are thus also suitable and are illustrated in FIGS. 1(A), 1(B).

Figure 2:
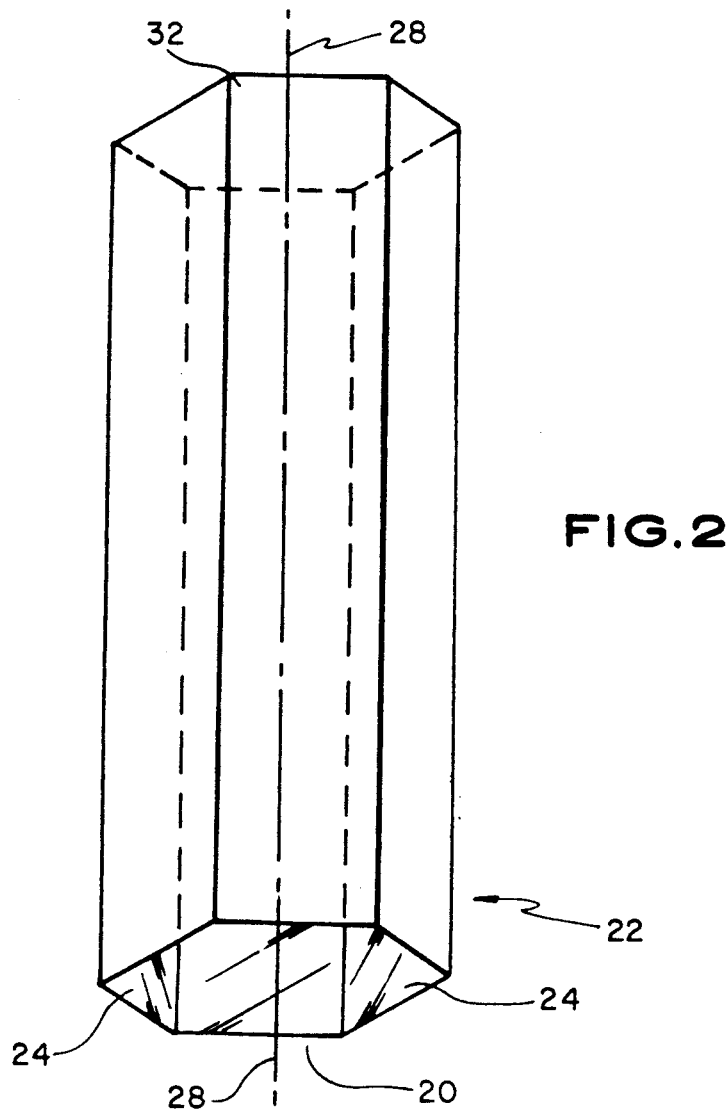
FIG. 2 is a perspective view of a light mixing channel utilized in the light assembly of the present invention.

FIG. 2 shows a light mixing channel 22 of the present invention in the form of a polygonal tubular structure (regular hexagon) whose interior sides 24 may be straight as shown, curved or tapered. The channel 22 is open on both ends 29,32, and hollow inside to allow light to pass through.

Figure 3:
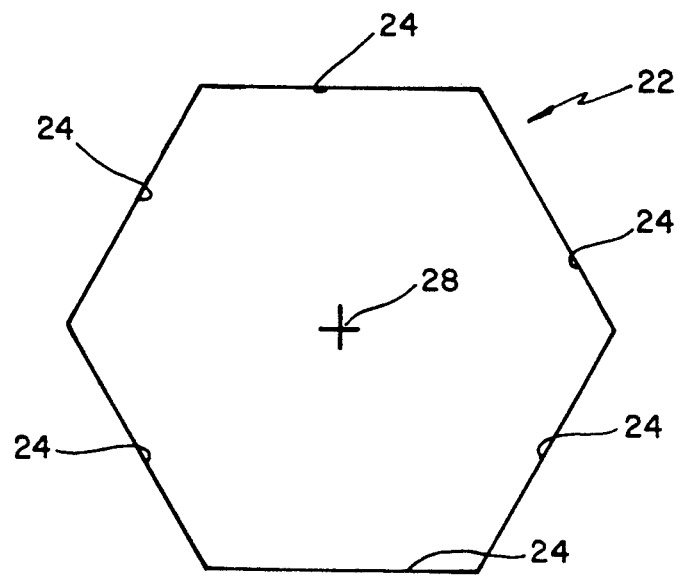
FIG. 3 is an end view of the channel of FIG. 2.

When viewed from an end 20,32 the geometry of as shown in FIG. 3 channel is similar to the fundamental polygonal geometry of a repetitive crystalline structure, (i.e. polygons that may be compactly and contiguously stacked in a two dimensional array indefinitely, without any spaces between their perimeters). This may also be accomplished with a structure having three or four sides as noted hereinabove.

Figure 4:
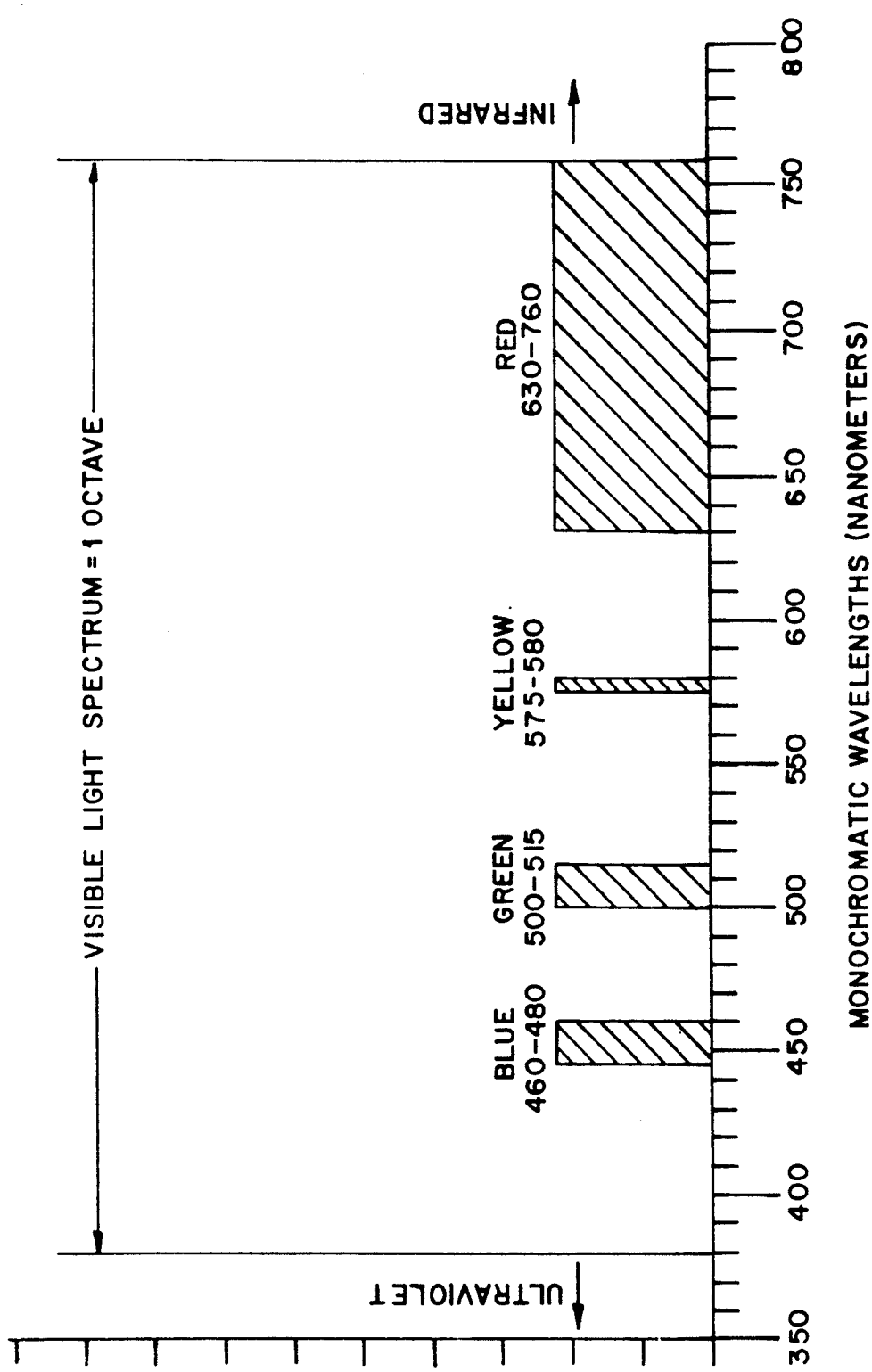
FIG. 4 is a representation of the visible light spectrum.

The geometrical shape of the cross-sectional polygon should be symmetrical about, and centered on, the optical axis 28 of the channel 22 and the systems. The interior surfaces 24 of the channel 22 are mirrored or polished so that they will reflect light in the entire visible spectrum i.e. wavelengths from 380 to 760 nanometers as illustrated in FIG. 4.

With reference to FIG. 5 the actual dimensions of the channel 22 may be adjusted to fit a desired dimensions of the optical projection system. In general, satisfactory results are obtained when with reference to FIG. 5 the following conditions are met:

The length of the light mixing channel 22, $L_T$ is equal to, or greater than, the distance, LC, between the conjugate focal points of the optical condensing system that is used to direct light rays from the light source 12 into the input end 20 of the channel 22.

The minimum inside diameter of the channel 22 should be as large as practically possible with the condition that the maximum perimeter of the cross-section of channel 22, measured in a plane orthogonal to the optical axis 28, be equal to, or less than, either the perimeter of the maximum aperture $A_P$ of the optical element 14 that is used to direct light rays from source 12 into the input end 20 of the channel 22, or the length, $L_T$ of the channel 22 whichever is less.

The color filter set of the present invention can be suitably arranged in an array of either three or four color filters. When an array of three filters is used, the filters should be a side-by-side planar array of a "balanced" set as shown in the filter set wheel of FIG. 6(A), of primary color hues, red, green, and blue, which when mixed together will form white light.

Figure 6B:
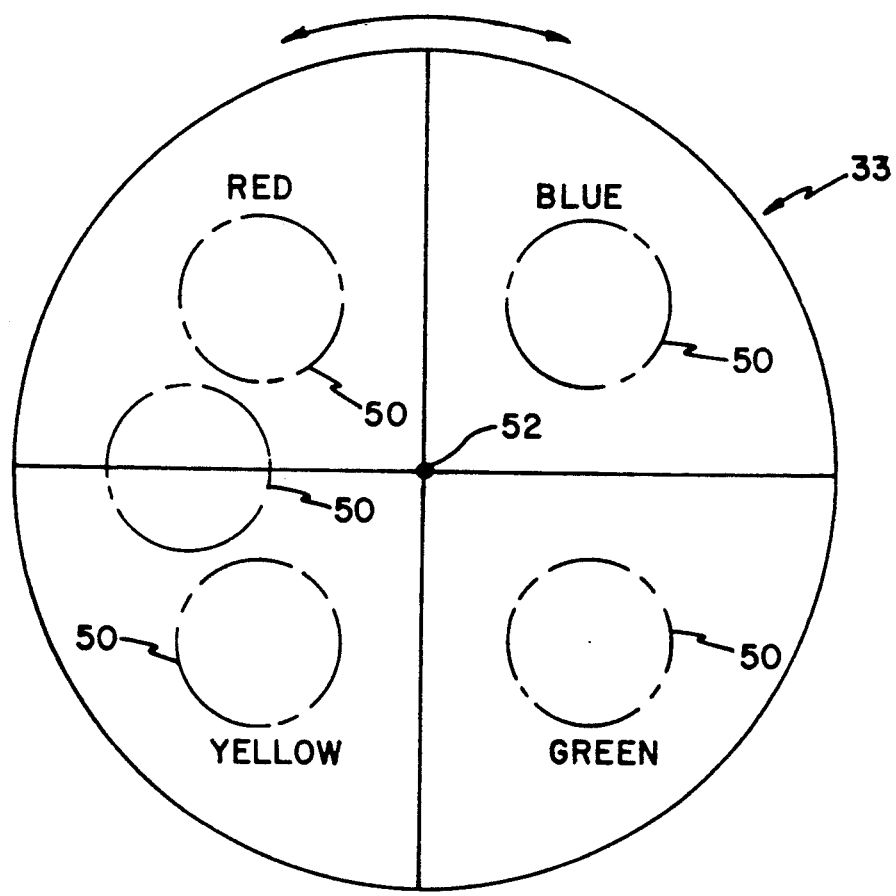
FIGS. 6(A), (B) show color filter arrays for use in the present invention in the form of color wheels.
Figure 7:
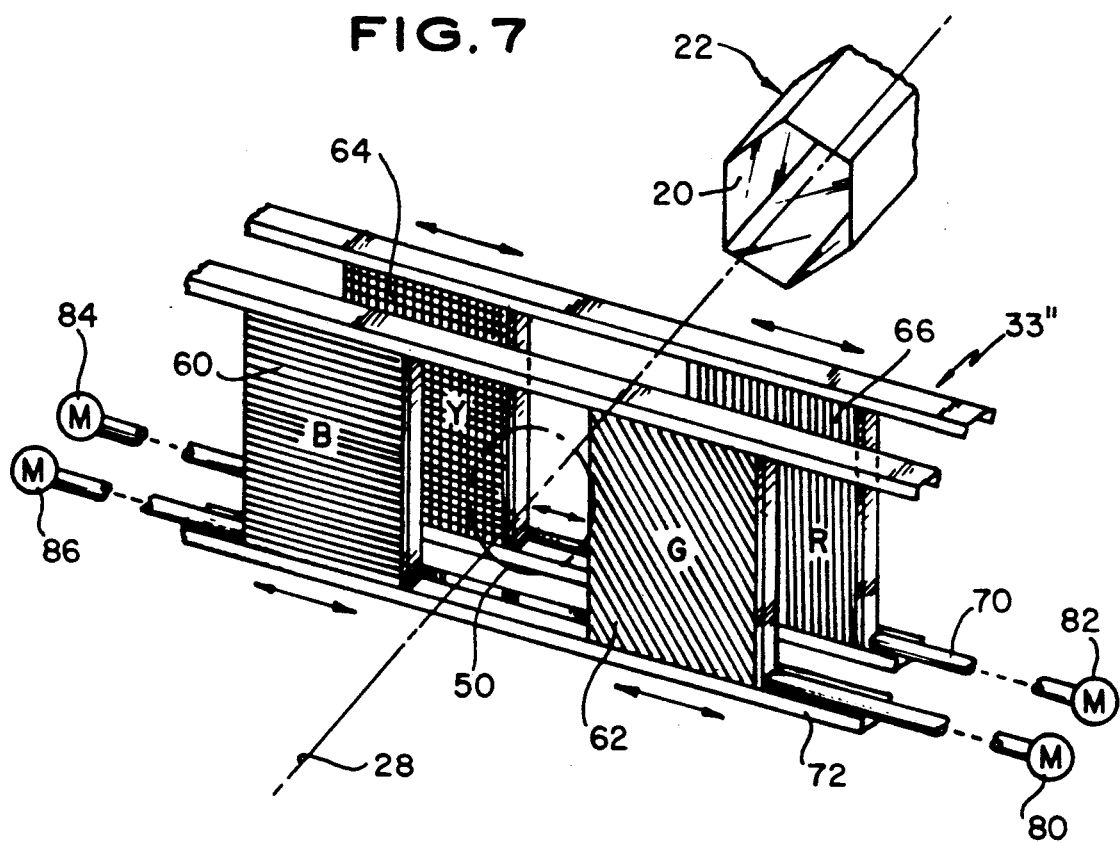
FIG. 7 is a perspective view of a slidable side-by-side color filter array for use in the present invention.

An array of four color filters as shown in the filter set wheel of 33 FIG. 6(B) and the slide assembly 33 of FIG. 7 is preferred. The colors are red, green, blue and yellow, four filter arrays. This combination provides more precise control of the amber/orange portion of the spectrum, and eliminates the diminished intensity that occurs when yellow is made by additively mixing green and red.

Each individual filter of the array used is large enough to completely cover the opening of 20 the channel 22 so that when desired all of the light rays from light source 10 can be intercepted by one filter as illustrated at 50 in FIG. 1 with appropriate rotation of color wheel filter set 33.

Figure 8:
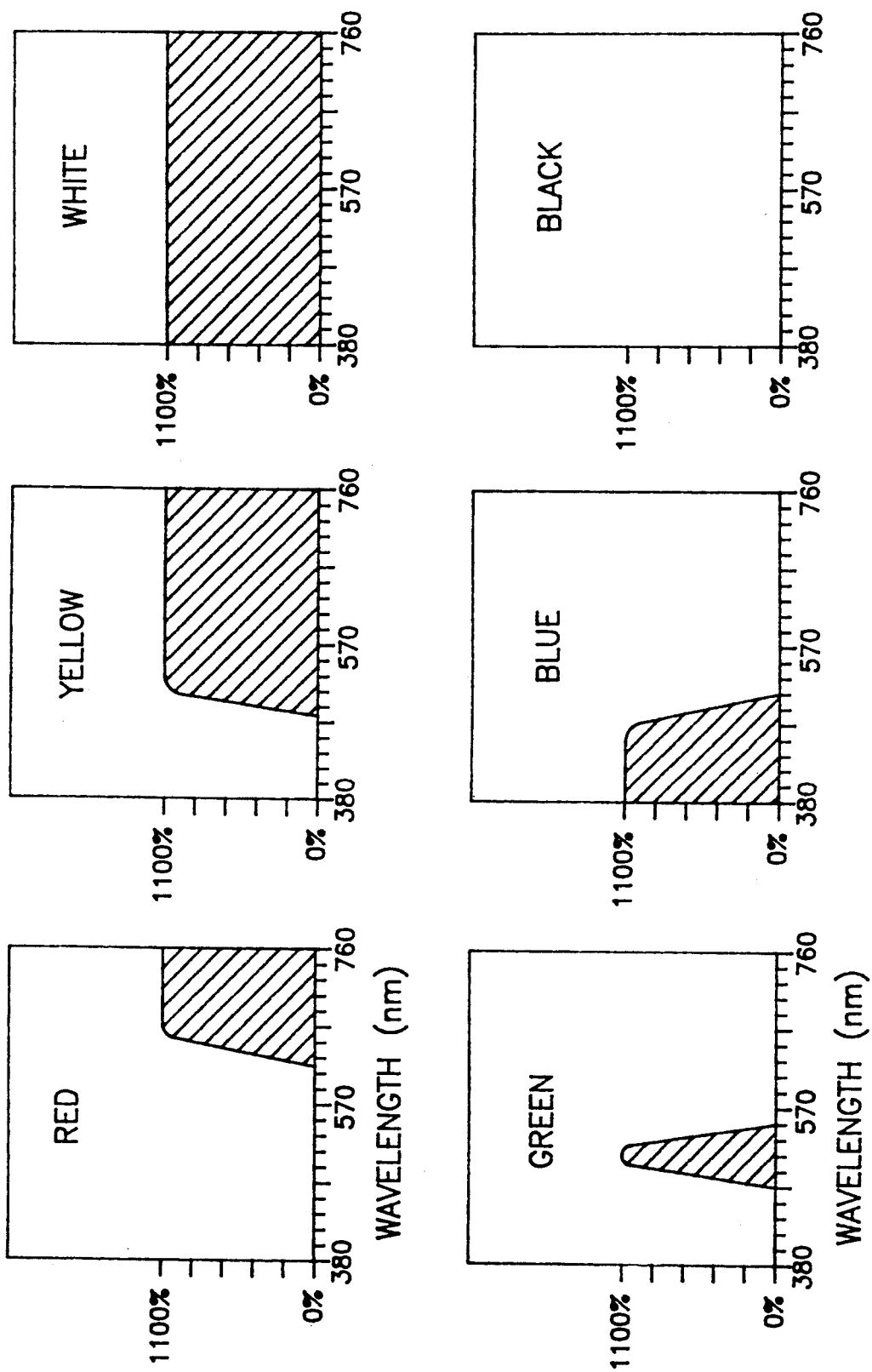
FIG. 8 shows the transmission characteristics for typical color filters.

Spectrum passband characteristics of the color filters of the arrays are shown in FIG. 8. Approximate passbands are indicated by the shaded areas. White and black are shown for reference purposes only.

The color filters of an array 33, 33', 33" are arranged substantially parallel to each other and transverse to the axis 28 of the light mixing channel 22 and such that they may be sequentially moved in and out of the light path 50 with the ability to maintain the edge of one filter optically touching the edge of the next filter in the sequence, without any spaces left between the edges of the filters. Complementary color (red is the complement of green, and yellow is the complement of blue) are in opposite mechanical quadrants 180° apart from each other and the edges of two complementary colors do not touch each other in sequence.

One particular embodiment for accomplishing this purpose is a rotatable disk such as shown in FIG. 6(B) which is rotatable about its central axis 52 in order to change the color hue as schematically shown at 50.

Another embodiment utilizing four color filters is shown in FIG. 7 when four separate, rectangular filters 60, 62, 64, 66 are movably mounted on parallel tracks 70, 72 such that the individual color filters 60, 62, 64, 66 are slidable in or out of the light path 50 transverse to longitudinal axis 28 of channel 22.

The color filters 60, 62, 64, 66 are arranged so that complementary color filters are on the same side of axis 28. This will enable two filters to slide in and out of the light path in the same sequence as with the rotable disk 33 of FIG. 6(B) by selective, sequential operation of filter motor drives 80, 82, 84, 86.

Figure 13:
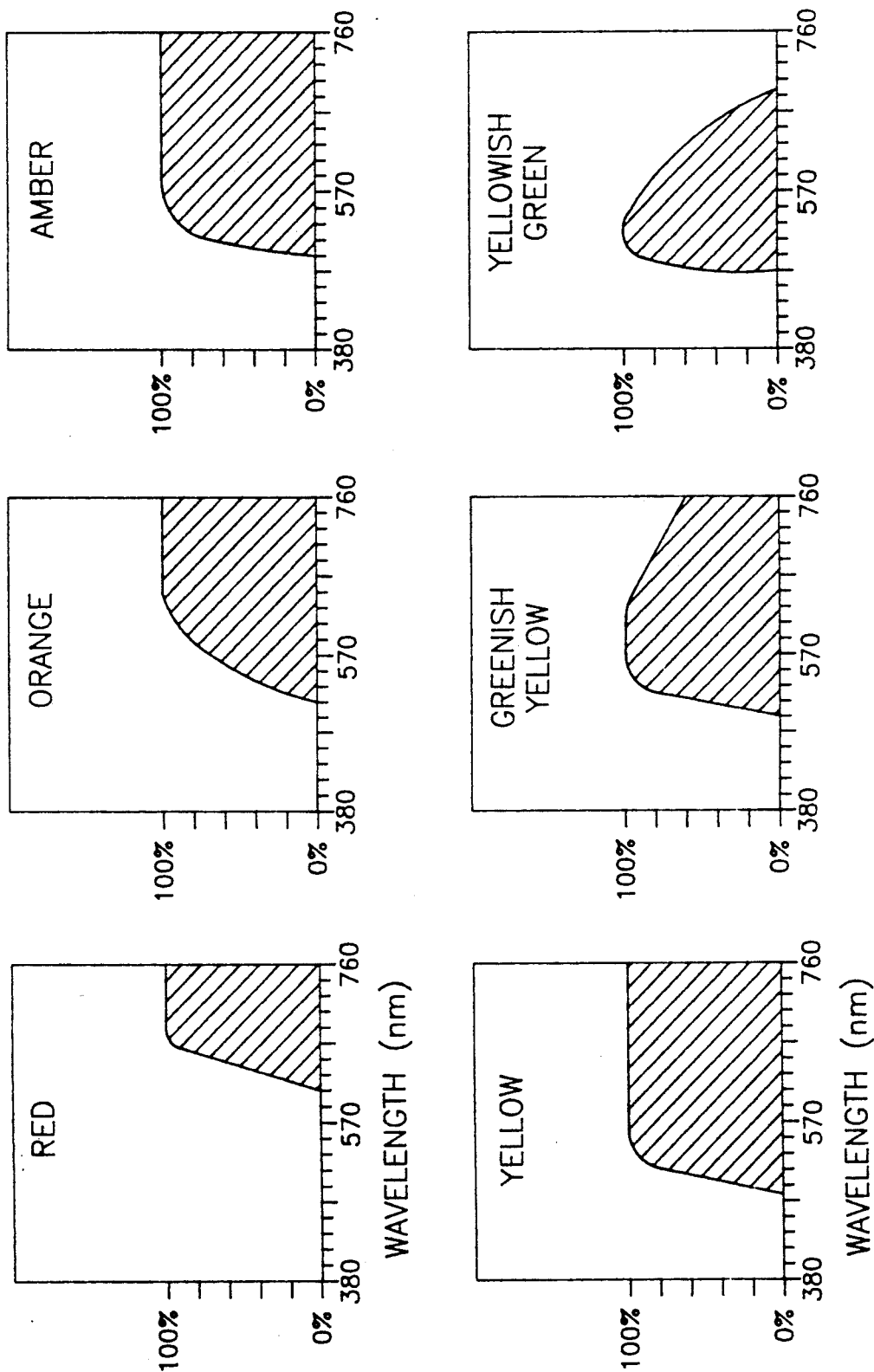
FIGS. 13, 14 show color transmission for the color wheel positions of FIGS. 9 and 10.
Figure 14:
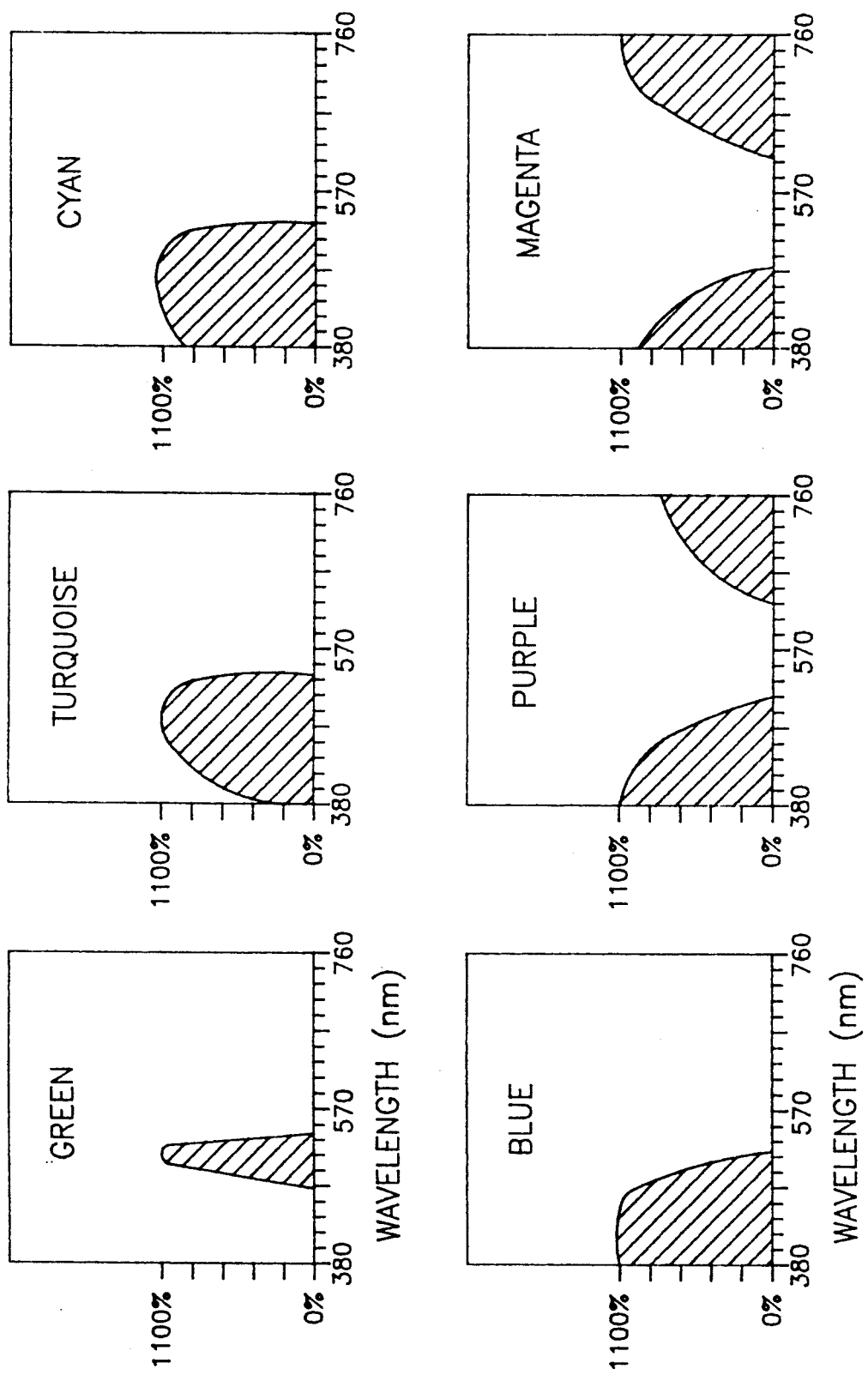

These selective sequential arrangements when used in conjunction with the light mixing channel 22 will allow the smooth transition from any visible color hue, to any other visible color hue, in any order desired. This is illustrated in FIGS. 9, 10, 11 and 12 in the conjunction with the spectral information illustrated in FIGS. 13, 14.

Figure 16:
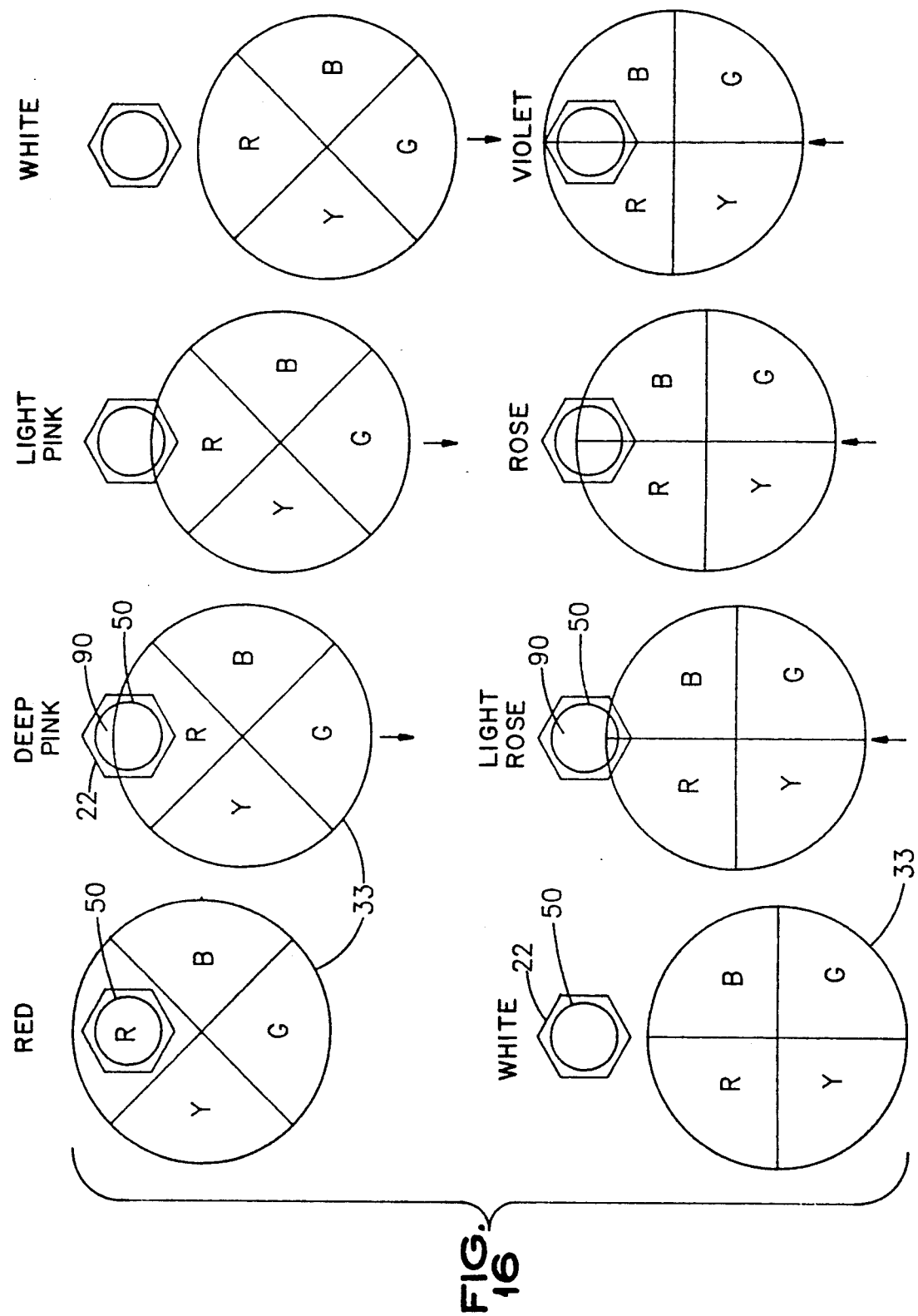
FIG. 16 shows positions of a color wheel array for different color saturations.

The color filter set must also be capable of displacing the filter, or filter combination in and out of the light path 50 in order to allow a selected amount of white light 90 to bypass the color filters, and enter the light mixing channel 22 together with colored light as illustrated in FIGS. 16 and 17.

By varying the proportions of colored and white light, it is possible to completely control the color saturation.

In the disk arrangement shown in FIG. 1(B) this is accomplished by sliding the entire disk assembly in or out of the light path, 50 as shown in FIG. 16.

Figure 15A:
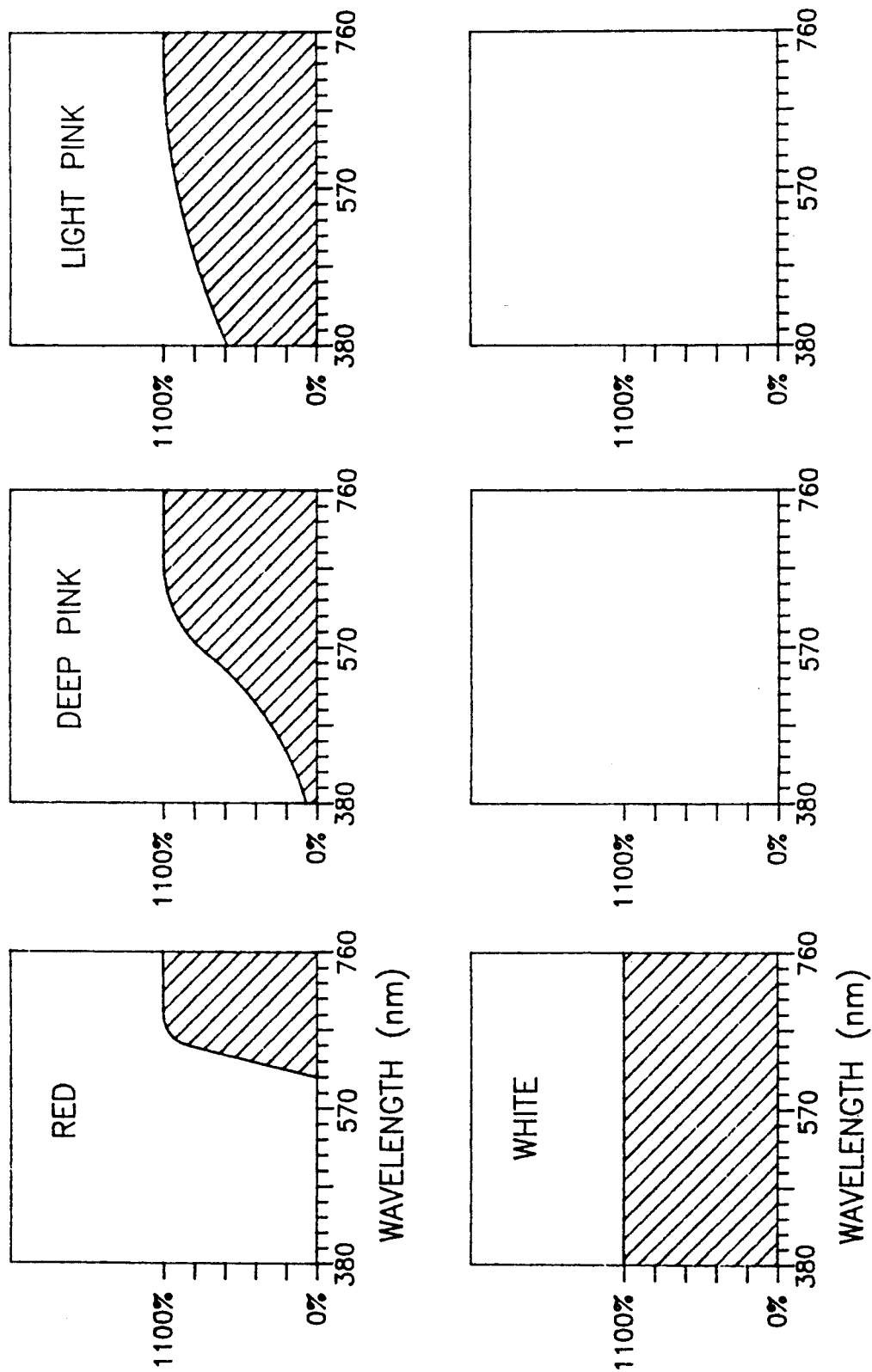
FIGS. 15(A) (B) show color transmission for the positions of slidable filter array of FIGS. 11, 12.
Figure 15B:
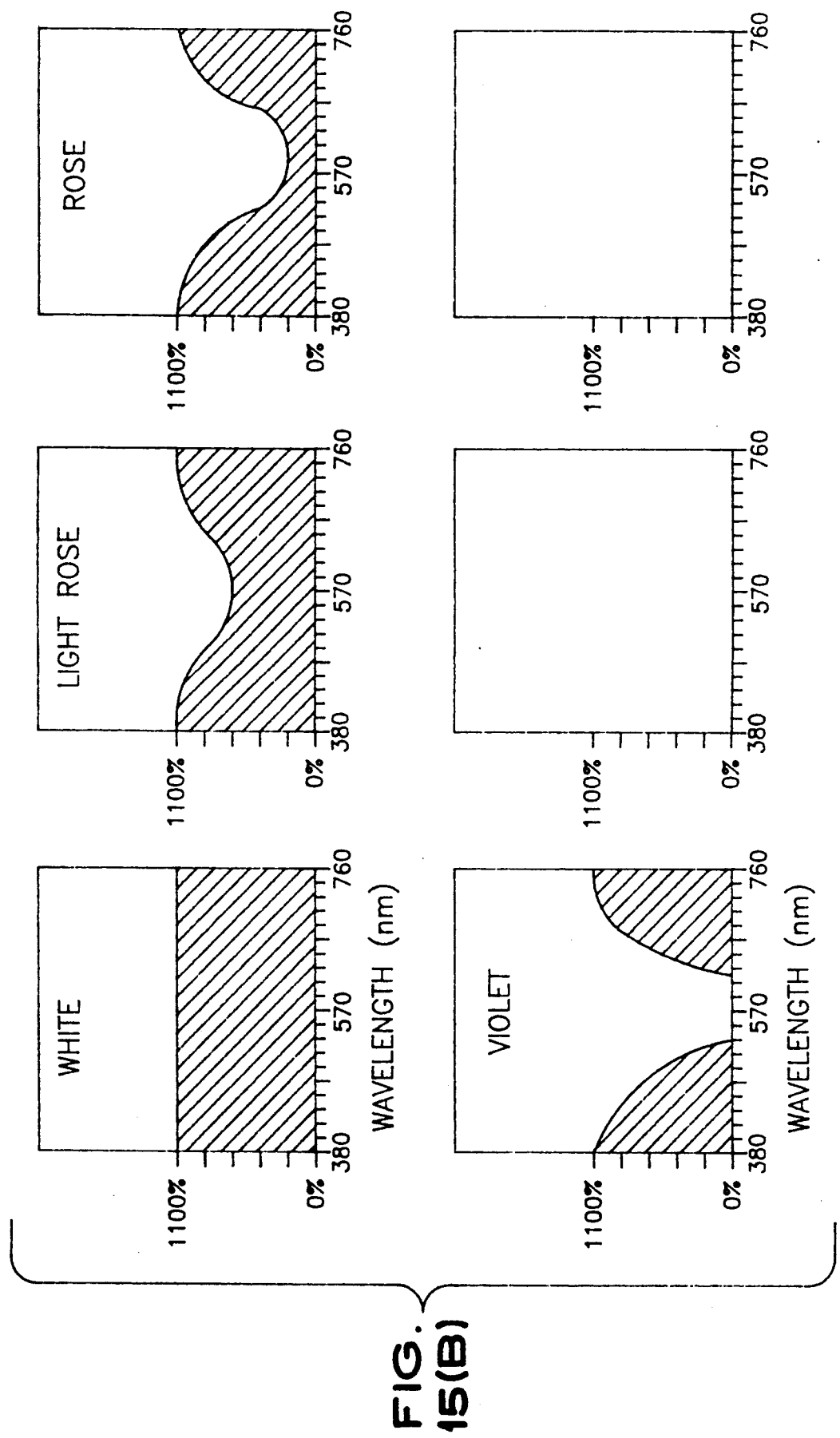

In the slidable filter array of FIG. 7 saturation control is achieved by establishing a gap between the edges of respective color filters, as shown in FIG. 17. Spectral information for FIGS. 16 and 17 is provided in FIGS. 15(A) and 15(B).

Figure 18A:
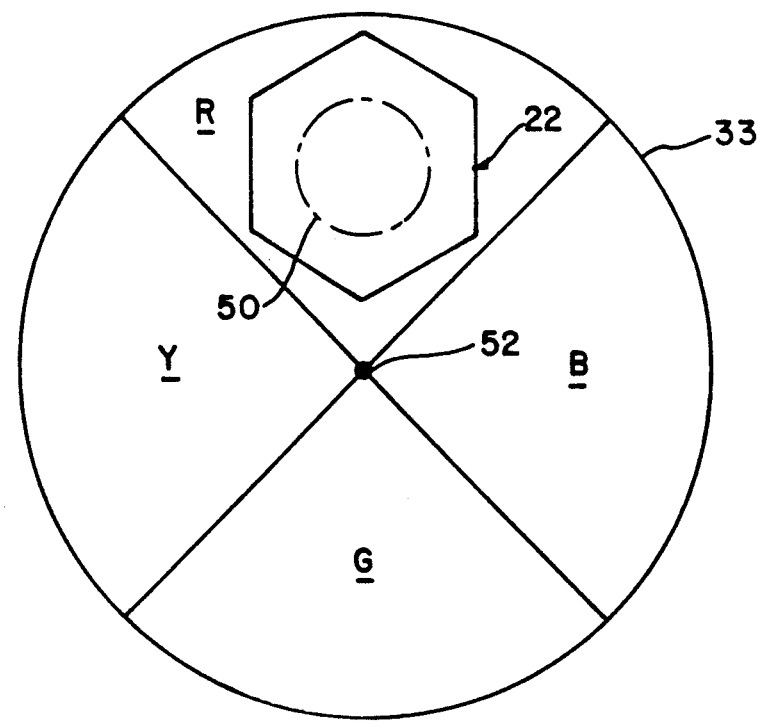

With reference to FIG. 18 when one or more colored light filters 60' (blue), 62' (green) of a filter set 33' are placed adjacent to each other, in a plane normal to the optical axis 28, in the path of white light ray 8 before the rays enter the input end 20 of the light mixing channel 22, such that some of the rays 100 pass through one filter 60' (blue) and other rays 102 pass through the filter 62' (green) and some white light 8 passes through a space 104 between the edges of the filters 60', 62' and enters the input end 20 of light mixing channel 11 then the light that enters the input end 22 of the light mixing channel 22 will consist of rays of two color (blue, green) and white light is entering the tube simultaneously.

With reference to FIG. 19(A) light rays R1 entering the input end 20 of the light mixing channel 22 and travelling nearly parallel to the optical axis 28, and whose trajectories do not intersect with any of the interior surfaces 24 will pass through the tube and directly out of the output end 32 without obstruction.

With reference to FIG. 19(B) light rays R2 entering the input end of 20 the light mixing channel at greater angles of incidence relative to the optical axis 28 whose trajectories T1 do intersect with an interior surface 24 will be reflected off the interior surface and continue on a new trajectory T2.

If the new trajectory T2 intersects with another interior surface as indicated at 110 the ray will be reflected again.

This process will continue until the trajectory no longer intersects with any interior surface 24 and the ray will exit the output end of the tube 32.

The combination of the direct and reflected light rays will behave as an array of multiple, multicolored light sources 115 on the interior surfaces 24 of light mixing channel 22 similar to the effect obtained in a kaleidoscope as indicated in the perspective output end view in FIG. 20 of light mixing channel 22.

With reference to FIG. 21 as the various multicolored rays C1, C2 and W cross each other at various angles inside the light mixing channel 22 they will cause modulated interference patterns to be formed, which will create a single, resultant, homogenous color wavefront, H, to be formed at the output end 32 of light mixing channel 22 and the hue and saturation of which is a function of the average of the proportionate amounts of the different color hues C1, C2 and white light, W, that enter the input end 20 of the light mixing channel 22.

With reference to FIG. 22 when the color filter array 33' and light mixing channel 22 are installed in an optical projection system 120 between a white light source with an optical condensing system 14 and the focused object of the projection 36, such that the light source condensing system can direct light selectively through color filters 60', 62', 64', 66' and into the input end 20 of the light mixing channel 22 and the focused object 36 of projection is located at, or near the output end 32 of the light mixing channel 22, then the projected image 40 of the object 36 will be uniformly illuminated with the resultant color.

Figure 9:
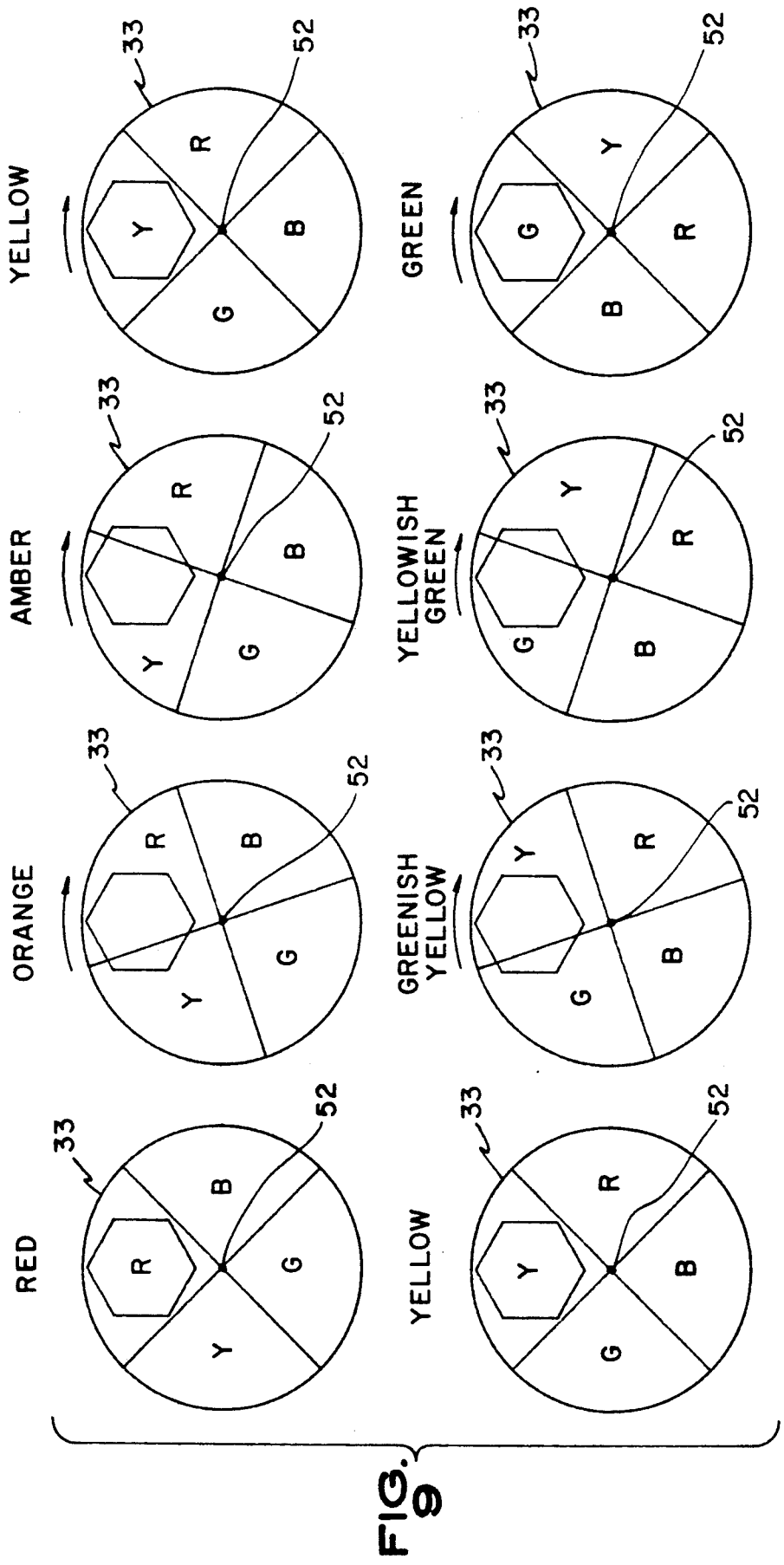
FIG. 9 and FIG. 10 show positions of a color wheel array for different color hues.
Figure 10:
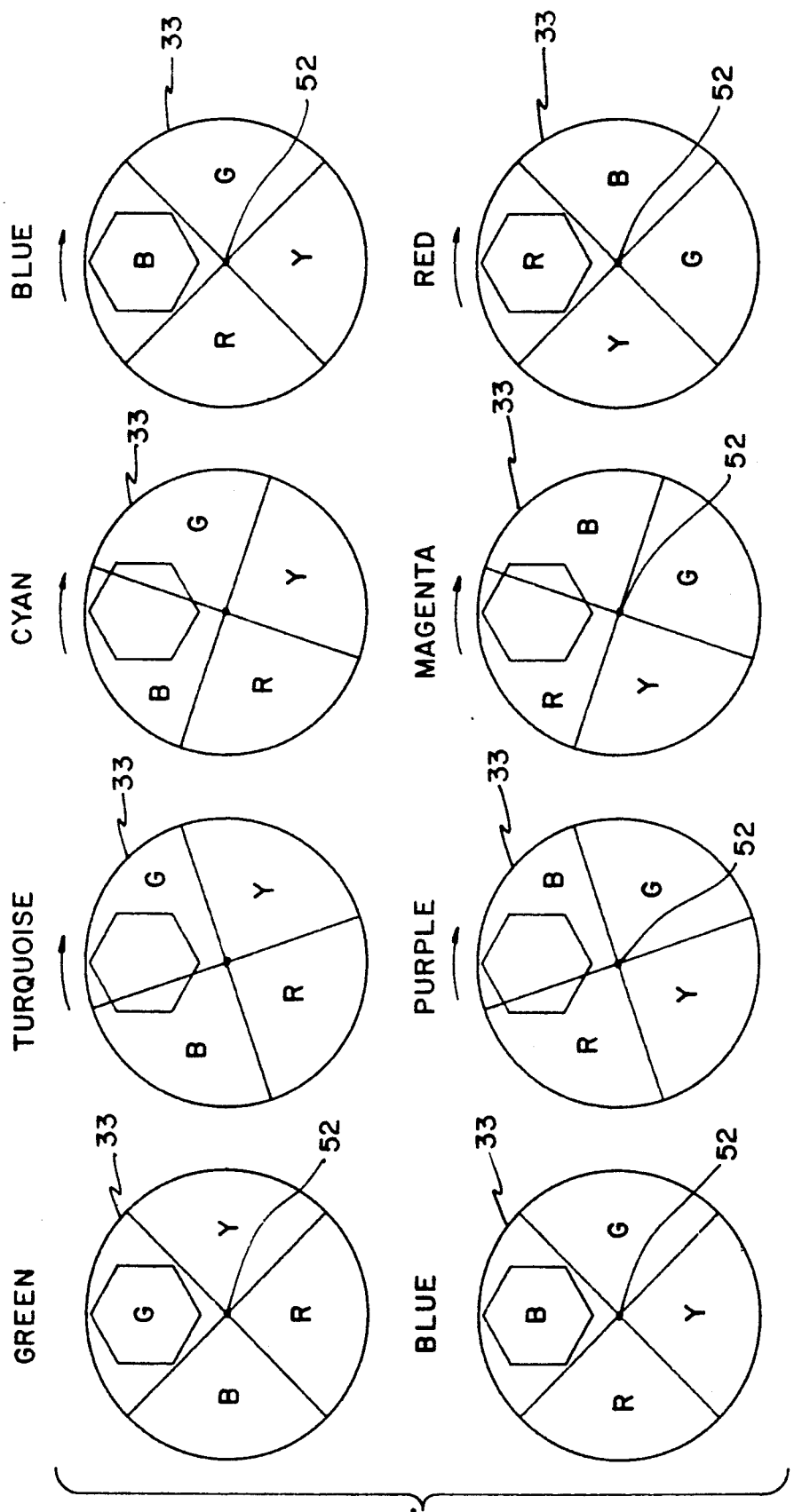
Figure 11:
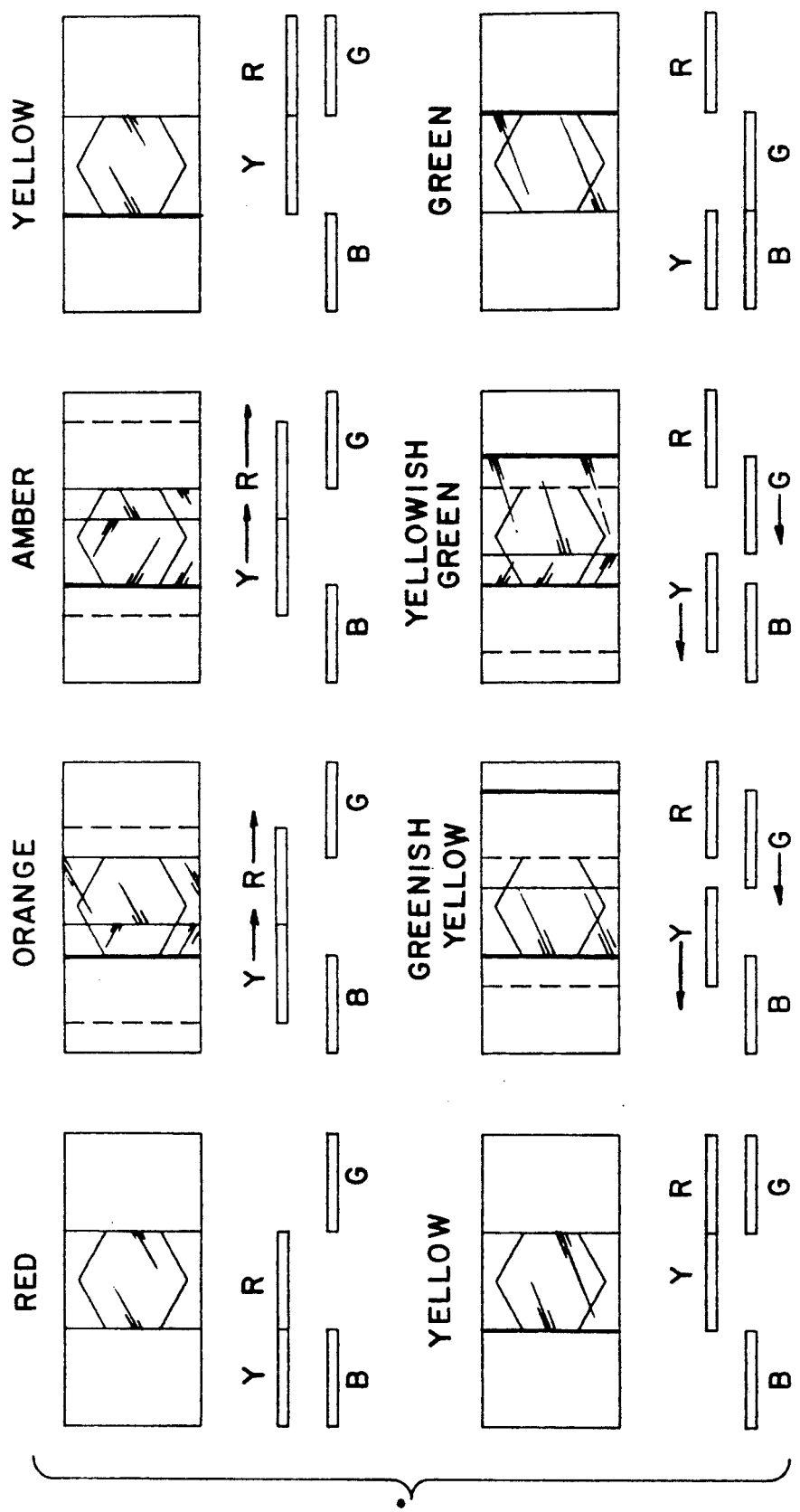
FIGS. 11 and 12 show positions of a slidable side-by-side color filter array for different color hues.
Figure 12:
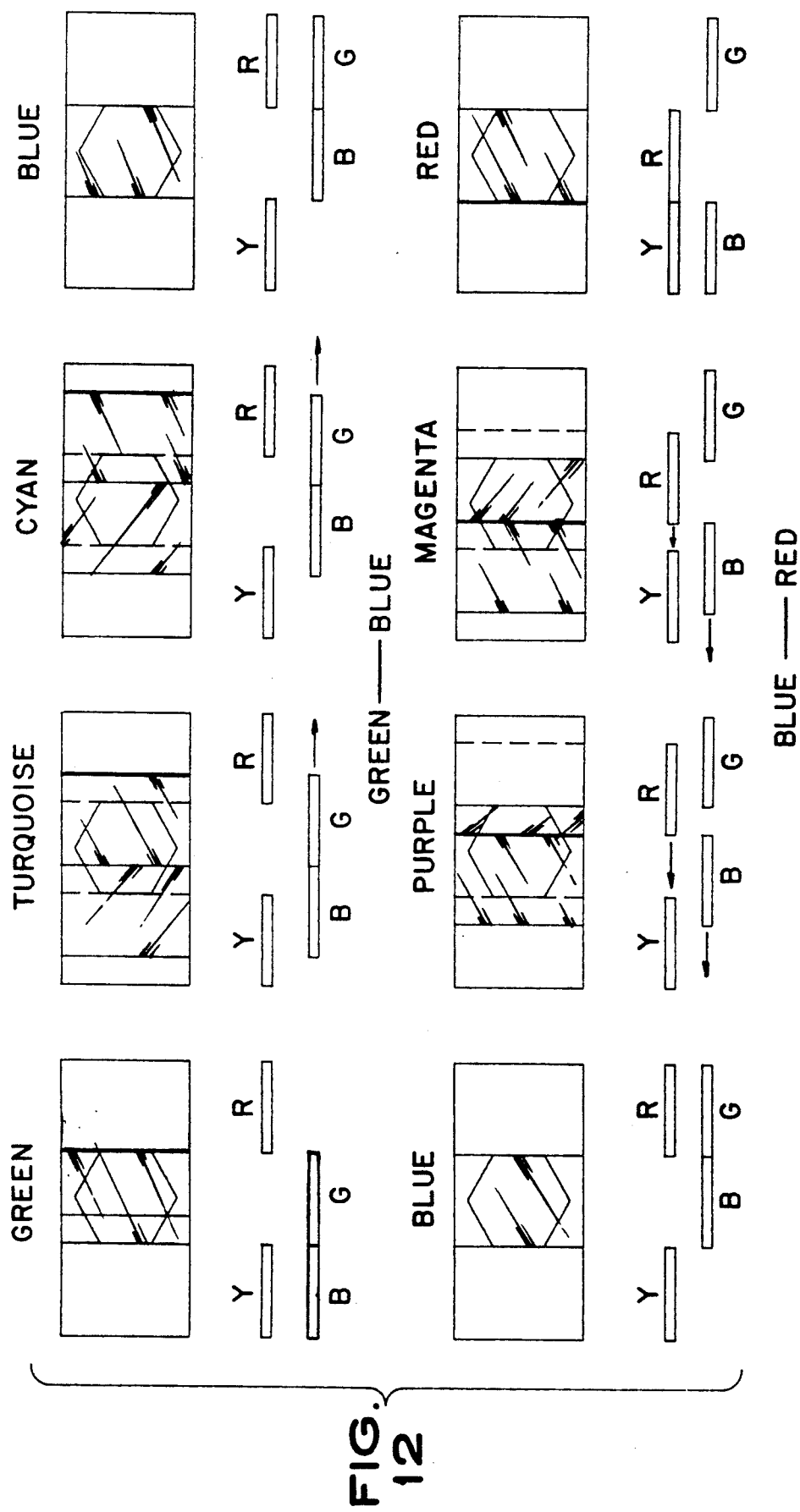

The resultant color hue may be varied by gradually sliding the colored filters in or out of the light path as illustrated in the previously discussed FIGS. 9, 10 for a color wheel array and FIGS. 11 and 12 for a side-by-side slidable filter array.

The color hue is controlled by varying the proportions of two adjacent color filters. The color saturation is controlled by varying the proportions of color filter and white light that bypasses the color filters as illustrated in the previously discussed FIGS. 16 and 17.

Figure 23:
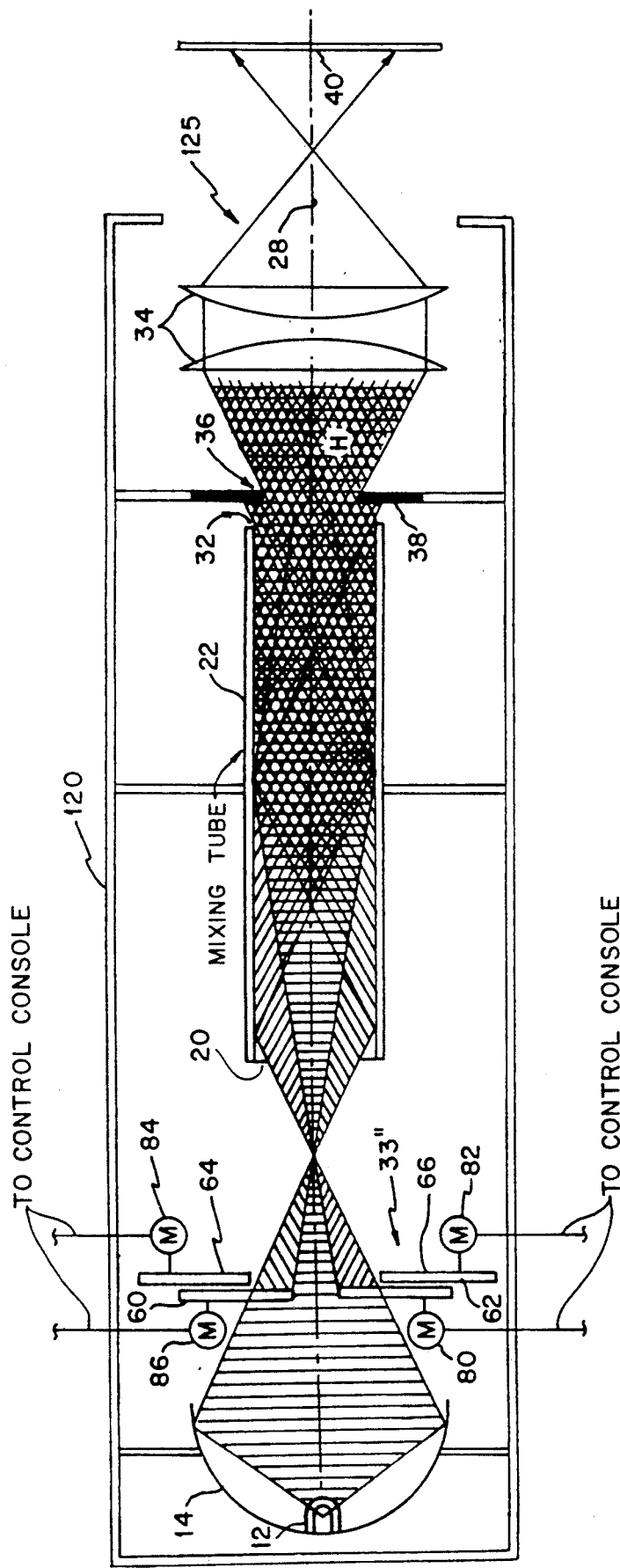
FIG. 23 shows a sectional side elevation view of a light assembly in accordance with the present invention.

FIG. 23 shows the system of FIG. 21 enclosed within a housing 120, suitably of rectangular or other convenient cross-sectional shape which has an opening at 125 for the passage of existing homogeneously mixed light rays. The slidable motor driven filter array 33", of FIG. 7 is shown installed within housing 120 and connected to a conventional control console (not shown).

Figures 24A, 24B:
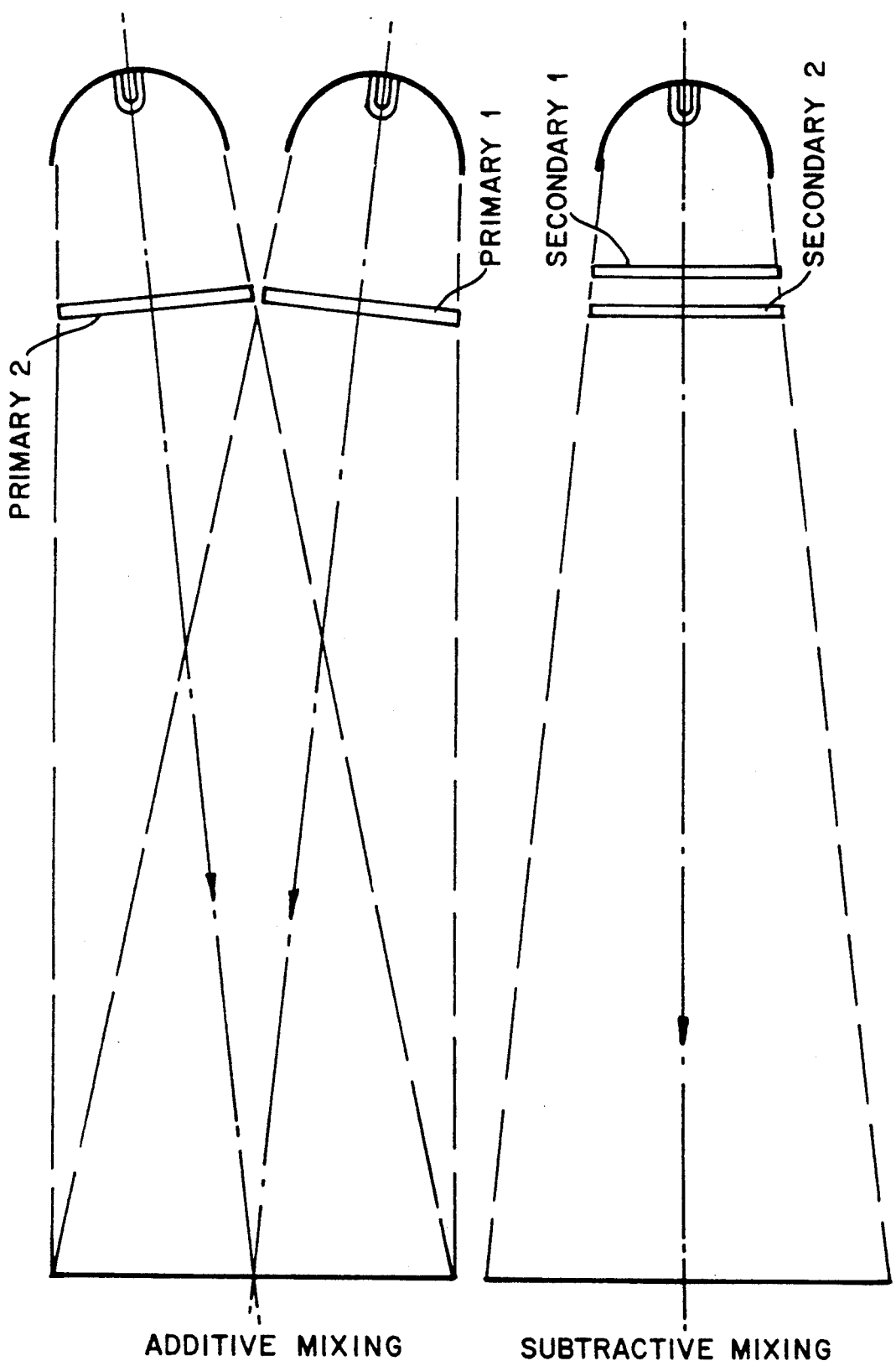
FIGS. 24(A), (B) show prior art light mixing techniques.

The technique of color control used in the device of the present invention is similar in effect to what is referred to in the art as "additive mixing" where two different color lights are focused on the same projection surfaces as illustrated in FIG. 24(A). In previous existing systems, this method is achieved by using multiple light bulbs and/or lighting fixtures, which consume energy, require more bulbs and more space, and are more difficult to control than a one bulb device.

Other prior art devices currently in use utilize "subtractive mixing" illustrated in FIG. 24(B) which is a technique wherein light rays are passed first through one color filter, then through another color filter and color variation is achieved by either changing the color filters, (which has a limited number of color combinations, and causes abrupt "bumps" in the color transitions), or tilting dichroic filters to change their angles of incidence relative to the optical axis of the system which alters the color hue that is transmitted, within a limited range.

Both of these prior art "subtractive" methods utilize two or more secondary color filters to produce a primary color which will be "dingy" (i.e. of poor quality and purity).

The "additive" method uses primary colors filters, individually to produce primary colors, or in combination to produce secondary colors. Additive mixing is the method used by a good quality color television, by utilizing thousands of tiny red, green, and blue dots.

While only certain preferred embodiments of this invention have been described, it is understood that many embodiments thereof are possible without departing from the principle of this invention as defined in the claims which follow.

Figure 6A:
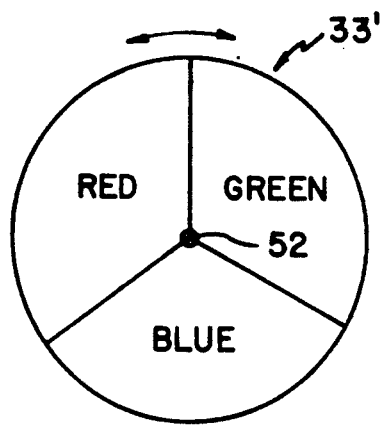
Figure 25A:
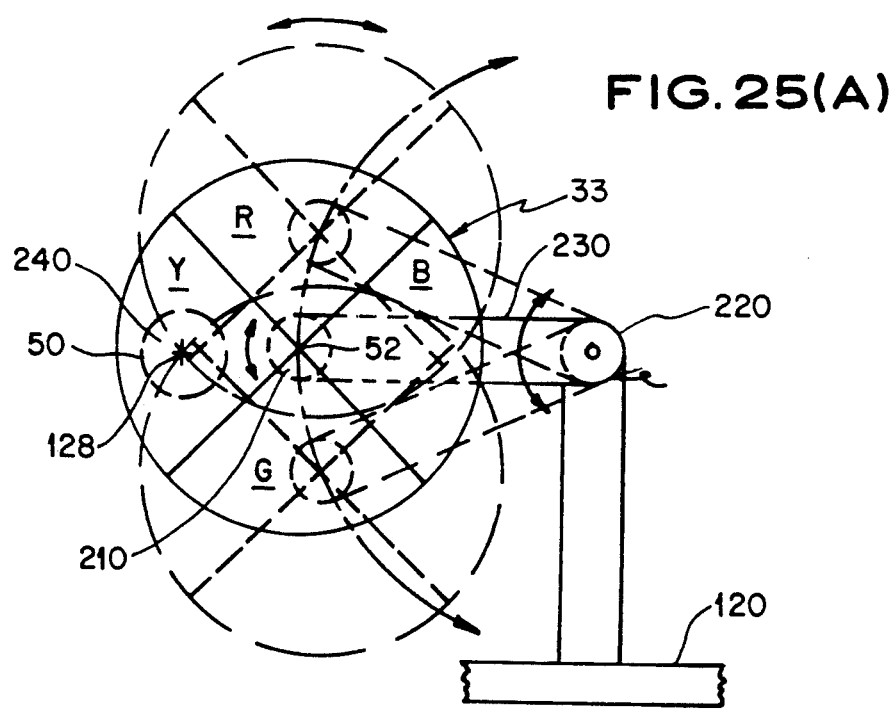
FIGS. 25(A), (B), (C) show a mechanism arrangement for positioning a color filter wheel array in a light assembly in accordance with the present invention.
Figure 25B:
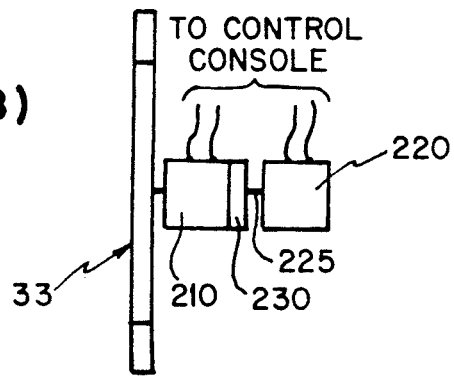
Figure 25C:
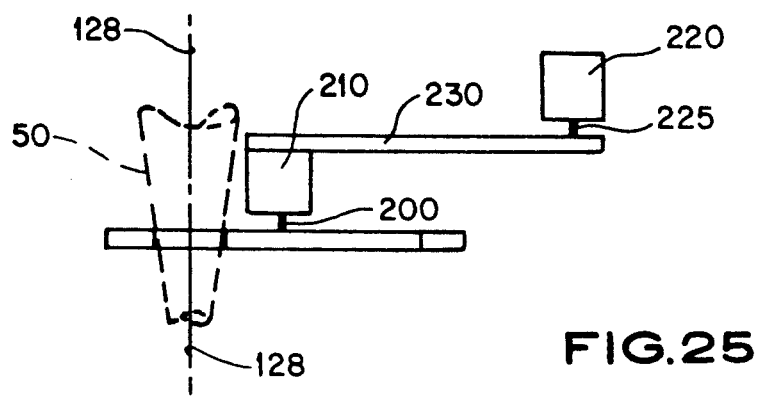

FIGS. 25(A), 25(B) show a color wheel filter set array 33 of the type shown in FIG. 6(A) arranged to be used in housing 120 in place of the slidable filter set array 33" shown in FIG. 23 and FIG. 7. Color wheel 33 is rotatably mounted at 52 on the shaft 200 of electric motor 210 which when activated at a control console (not shown) will position the desired filter or pair of filters in light beam 50. Electric motor 220 is mechanically coupled to arm 230 at 225 and when actuated at a control console (not shown) will move arm 230, and the filter wheel will be moved to be partially out of the path of light beam 50, e.g. to one of the "dotted" positions shown in FIG. 25(A) to by-pass the filter wheel 33 as indicated at 240. The arrangements of FIGS. 25(A), (B), (C) enables the positioning of color wheel 33 as illustrated in FIGS. 9, 10 and 16. FIG. 26 shows a block diagram for a conventional control console arrangement for appropriately positioning the color filters as hereinabove described.

What is claimed is:

1. Light assembly comprising:
   (a) means for providing a point light source;
   (b) an elongate, longitudinally extending peripherally enclosed light mixing channel having a longitudinal axis and a continuous highly reflective inner surface, said channel being open at each of its longitudinally opposed ends and positioned to receive light rays from said point light source at one of said longitudinally opposed ends and to transmit additively mixed light rays from said source at the other of said longitudinally opposed ends; and
   (c) objective lens means positioned to receive said additively mixed light rays and provide a focused image thereof.

2. Light assembly in accordance with claim 1 wherein said light mixing channel has a cross-section along its longitudinal axis which is either may be a hexagon, quadrilateral, or triangle, or other combinations of polygons.

3. Light assembly in accordance with claim 2 wherein the point light source is located substantially on said longitudinal axis of said light mixing channel.

4. Light assembly in accordance with claim 1 wherein the optical axis of said objective lens means is substantially coincident with said longitudinal axis of said light mixing channel.

5. Light assembly in accordance with claim 1 where a filter set is positioned between said point light source and said light mixing channel and comprises:
   (a) at least three planar filters arranged substantially parallel to each other and transverse to the longitudinal axis of said light mixing channel, each of said filters being movable transverse to the longitudinal axis of the light mixing channel from a position completely intercepting the light rays from said point light source which are received by said light mixing channel to a position at which none of said light rays are intercepted to thereby vary the amount of light from said light source passing therethrough; and
   (b) means for moving each of said filters so that at least portions of two filters are positionable to intercept different light rays from said light source which are received by said light mixing channel to vary the portion of said light rays intercepted by said filters to thereby cause a change in the saturation and hue of the focused image provided by said objective lens means.

6. Light assembly in accordance with claim 5 wherein each of three filters are of a different primary colors selected from red, blue, green and wherein at least portions of two filters of complementary primary colors can be positioned to simultaneously intercept light rays received by said light mixing channel.

7. Light assembly in accordance with claim 1 wherein a filter set is positioned between said point light source and said mixing channel and comprises:
   (a) four planar filters, each of a different primary color selected from red, blue, green, yellow, with two of said filters of non-complementary colors being arranged in two separate arrays of two filters each, each array being in a separate plane transverse to the longitudinal axis of said light mixing channel, the respective filters of each array being movable in the transverse plane of such array in and out of close contact with each other and movable from a position completely intercepting the light rays from said point light source which are received by said light mixing channel to a position at which none of said light rays are intercepted to vary the amount of light from said light source passing therethrough; and
   (b) means for moving each of said filters so that at least portions of the two filters of each array are simultaneously positionable to intercept different light rays from said light source which are received by said light mixing channel to vary the amount of said light rays intercepted by said filters to thereby cause a change in the saturation and hue of the focused image provided to said objective lens means.

8. Light assembly in accordance with claim 7 wherein the two filters of one array are respectively blue and green and the two filters of the other array are respectively yellow and red.

* * * * *